(12) United States Patent
Jo et al.

(10) Patent No.: US 9,994,488 B2
(45) Date of Patent: Jun. 12, 2018

(54) ULTRAFINE CONTINUOUS FIBROUS CERAMIC FILTER AND METHOD OF MANUFACTURING SAME

(71) Applicant: KOREA INSTITUTE OF SCIENCE AND TECHNOLOGY, Seoul (KR)

(72) Inventors: Seong Mu Jo, Seoul (KR); Dong Young Kim, Seoul (KR); Sung-Yeon Jang, Daegu (KR); Jeong Joo Choo, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 78 days.

(21) Appl. No.: 15/146,204

(22) Filed: May 4, 2016

(65) Prior Publication Data

US 2016/0244373 A1  Aug. 25, 2016

Related U.S. Application Data

(63) Continuation of application No. 13/098,872, filed on May 2, 2011, now abandoned.

(30) Foreign Application Priority Data

May 3, 2010 (KR) .................... 10-2010-0041315

(51) Int. Cl.
C04B 35/76 (2006.01)
B01D 39/20 (2006.01)
(Continued)

(52) U.S. Cl.
CPC .......... *C04B 35/76* (2013.01); *B01D 39/2079* (2013.01); *B01D 39/2082* (2013.01);
(Continued)

(58) Field of Classification Search
CPC .............. C04B 35/76; C04B 35/62236; C04B 35/63444; C04B 35/6224;
(Continued)

(56) References Cited

U.S. PATENT DOCUMENTS

| 2008/0026041 A1* | 1/2008 | Tepper ............... B01D 39/2017 424/445 |
| 2008/0274403 A1* | 11/2008 | Kim ...................... B82Y 30/00 429/209 |
| 2009/0050578 A1 | 2/2009 | Israel et al. |

OTHER PUBLICATIONS

USPTO RR dated Jul. 25, 2013 in connection with U.S. Appl. No. 13/098,872.
(Continued)

*Primary Examiner* — Madeline Gonzalez
(74) *Attorney, Agent, or Firm* — Ladas & Parry LLP

(57) ABSTRACT

An ultrafine continuous fibrous ceramic filter, which comprises a filtering layer of a fibrous porous body, wherein the fibrous porous body comprises continuous ultrafine fibers of metal oxide which are randomly arranged and layered, and powdery nano-alumina incorporated into the ultrafine fibers or coated thereon, the ultrafine fibers being obtained by electrospinning a spinning solution comprising a metal oxide precursor sol-gel solution, and optionally, a polymer resin, and sintering the electrospun fibers, in which the ultrafine fibers have an average diameter of 10~500 nm, and the fibrous porous body has a pore size of maximum frequency ranging from 0.05 to 2 μm, exhibits high filtration efficiency at a high flow rate, and can be regenerated.

17 Claims, 6 Drawing Sheets

(51) Int. Cl.

| | | |
|---|---|---|
| *C04B 35/622* | (2006.01) | |
| *D01D 5/00* | (2006.01) | |
| *B01D 67/00* | (2006.01) | |
| *B01D 69/10* | (2006.01) | |
| *B01D 69/14* | (2006.01) | |
| *B01D 71/02* | (2006.01) | |
| *B82Y 30/00* | (2011.01) | |
| *C04B 35/624* | (2006.01) | |
| *C04B 35/626* | (2006.01) | |
| *C04B 35/628* | (2006.01) | |
| *C04B 35/634* | (2006.01) | |

(52) U.S. Cl.
CPC ..... *B01D 39/2089* (2013.01); *B01D 67/0041* (2013.01); *B01D 69/10* (2013.01); *B01D 69/141* (2013.01); *B01D 71/024* (2013.01); *B01D 71/025* (2013.01); *B82Y 30/00* (2013.01); *C04B 35/624* (2013.01); *C04B 35/6224* (2013.01); *C04B 35/6264* (2013.01); *C04B 35/62236* (2013.01); *C04B 35/62245* (2013.01); *C04B 35/62813* (2013.01); *C04B 35/62892* (2013.01); *C04B 35/63444* (2013.01); *D01D 5/0007* (2013.01); *B01D 2239/025* (2013.01); *B01D 2239/0258* (2013.01); *B01D 2239/0478* (2013.01); *B01D 2239/086* (2013.01); *B01D 2239/1216* (2013.01); *B01D 2239/1225* (2013.01); *B01D 2323/39* (2013.01); *C04B 2235/3218* (2013.01); *C04B 2235/441* (2013.01); *C04B 2235/443* (2013.01); *C04B 2235/5228* (2013.01); *C04B 2235/5252* (2013.01); *C04B 2235/5264* (2013.01); *C04B 2235/5268* (2013.01); *C04B 2235/5296* (2013.01); *D10B 2101/08* (2013.01); *D10B 2505/04* (2013.01)

(58) Field of Classification Search
CPC ............ C04B 35/62245; C04B 35/624; C04B 35/6264; C04B 35/62813; C04B 35/62892; C04B 2235/5228; C04B 2235/3218; C04B 2235/441; C04B 2235/5252; C04B 2235/5264; C04B 2235/5268; C04B 2235/5296; C04B 2235/443; B01D 39/2082; B01D 39/2079; B01D 39/2089; B01D 69/141; B01D 71/024; B01D 71/025; B01D 69/10; B01D 67/0041; B01D 2239/0258; B01D 2239/025; B01D 2239/0478; B01D 2239/086; B01D 2239/1216; B01D 2239/1225; B01D 2323/39; B82Y 30/00; D01D 5/0007; D01B 2505/04; D01B 2101/08
USPC .............. 210/496, 503–508, 510.1; 977/777; 427/458; 55/523, 527, 528; 501/80, 82
See application file for complete search history.

(56) References Cited

OTHER PUBLICATIONS

USPTO NFOA dated Oct. 23, 2013 in connection with U.S. Appl. No. 13/098,872.
USPTO FOA dated May 19, 2014 in connection with U.S. Appl. No. 13/098,872.
USPTO NFOA dated Mar. 12, 2015 in connection with U.S. Appl. No. 13/098,872.
USPTO FOA dated Sep. 9, 2015 in connection with U.S. Appl. No. 13/098,872.
USPTO AA dated Dec. 21, 2015 in connection with U.S. Appl. No. 13/098,872.

* cited by examiner

ULTRAFINE CONTINUOUS FIBROUS CERAMIC FILTER AND METHOD OF MANUFACTURING SAME

TECHNICAL FIELD

The present invention relates to an ultrafine continuous fibrous ceramic filter, which exhibits high filtration efficiency at a high flow rate, and can be regenerated, and to a method of manufacturing same.

BACKGROUND ART

There has been a recent upsurge in demand for highly advanced techniques for water purification capable of removing not only physical contaminants such as organic materials, heavy metals, etc. but also biological impurities such as viruses. Such a water purification system typically includes a membrane filter having pores smaller than particles that are to be filtered out. Examples of the membrane filter include a microfiltration filter (MF; pore size 50~2000 nm), an ultrafiltration filter (UF; pore size 1~200 nm), and a reverse osmosis filter (RO; pore size 0.1~2 nm). The membrane-based liquid filter/separation techniques are regarded as very important in water treatment fields including oil/water emulsion separation and desalting, since they are very effective in separating fine particles, bio macromolecules, oil/water emulsions, salts, and ultrafine particles such as viruses. The RO or UF membrane is capable of removing particles larger than 60 nm, and hence is used to remove bacteria or toxic viruses from water, air or blood. The size of pathogenic viruses such as the SARS virus and avian influenza virus is in ranges of 80~200 nm. However, in order to remove ultrafine particles (virus) of 30 nm or less, the size of pore must be much smaller. This results in a drastic pressure drop and reduces process flow rates. In addition, during use, membranes are susceptible to clogging which further degrades the flow rates, and back washing must be used. Back washing markedly increases operating costs and undesirably causes membrane damage or pore size increase. Accordingly, there has been a demand for a filtering device having a low operating pressure and an improved filtration efficiency in a large scale plant.

Mesh filters or non-woven fabric filters are known to have low pressure drop. A fibrous depth filter is a non-woven fabric filter composed of layers of randomly oriented fibers (LROF). The porous structure is defined by gaps between the fibers, and thus pores become smaller in proportion to an increase in the thickness of the filter layer. When having a proper thickness, the filter can retain fine particles by size exclusion. This filter is capable of filtering 85~95% by weight of fine particles but cannot filter ultrafine particles such as viruses.

Melt-blown non-woven fabrics usually have a fiber diameter of 1 μm or more and thus a filter made thereof cannot filter nanoparticles such as viruses. Even when ultrafine fibers having a diameter distribution of 5~500 nm are used, fibers having a larger diameter are present so that large pores are formed, undesirably decreasing the level of filtering precision and making it difficult to remove water-borne viruses having a size of 10~100 nm.

On the other hand, ultrafine fibers having a diameter corresponding to $\frac{1}{10}$~$\frac{1}{1000}$ of the diameter of melt-blown fibers may be manufactured using electrospinning. Non-woven fabric filters manufactured using this type of fiber have an operating pressure much lower compared to an MF filter using a porous membrane. However, it is very difficult to increase the level of filtering precision enough to remove nanoparticles such as viruses, while maintaining low operating pressures and high flow rates. The reason for this is that there is a limit in decreasing the pore size sufficiently to filter ultrafine particles such as viruses, by minimizing the fiber fineness, and also that a small pore size drastically increases the operating pressure while undesirably sharply decreasing the flow rate.

International Publication No. WO 07/054040 discloses various polymeric nanofiber filters. However, these polymeric nanofiber filters suffer from a short lifespan, low thermal stability, swelling properties in various solvents, and difficulties in surface modification.

In contrast, a ceramic nanofilter mainly used to purify wastewater has higher corrosion resistance and mechanical strength, and a long lifespan. Specifically, whereas the polymer filter is easily damaged during steam cleaning or chemical processes periodically conducted to remove contaminants, the ceramic filter is stable even at a high temperature of 500° C. and is chemically inactive, thereby enabling easier maintenance in terms of washing and regeneration.

The ceramic filter is typically manufactured from a sol-gel solution of a metal oxide precursor, and comprises a support layer provided in the form of a thin film having pores with a size of 1 μm and an uppermost layer having nano-sized pores. The pores of the ceramic filter are formed by voids between ceramic particles, in which the ceramic particles having different sizes are arranged in a layer-by-layer deposition form, thus forming a ceramic membrane having a gradation structure. However, in the sol-gel process, it is often difficult to control the pore size because of the particles having an irregular shape, and undesirable cracks or pinholes may be formed in the uppermost layer during drying and sintering processes. Also, when pore size is decreased to increase selectivity, a serious loss in the permeation flow rate and agglomeration of fine particles in the uppermost layer may occur, and thus it is difficult to maintain high selectivity and high permeation flow rate. Furthermore, a dead end pore structure which does not contribute to filtration is formed, and thus the porosity of the separation layer is very low to the extent of 36% or less. Hence, it is very difficult to actually obtain a porous ceramic filter having both superior selectivity and a sufficiently high permeation flow rate.

U.S. Pat. No. 7,601,262 discloses a water treatment composite filter that uses powdery aluminum hydroxide nanofibers in order to remove nano-sized viruses or particles. This filter is manufactured from an alumina sol bound to glass microfibers having a length of 2~3 mm. Because the aluminum hydroxide nanofibers are powdery and thus cannot form a filter, glass fibers are used to increase mechanical strength and formability of the filter. In order to increase the precision of filtering, the thickness of the alumina filter is doubled but the permeation flow rate is thereby cut by half. Briefly, increase in the mechanical strength of the filter results in a loss in the permeation flow rate.

International Publication No. WO 08/034190 discloses a filter capable of removing ultrafine particles such as viruses which is composed exclusively of powdery metal oxide nanofibers, without a glass fiber support, manufactured by using a suspension of metal oxide nanofibers having a length larger than a diameter and has a pore size of 1~100 nm. In this case, however, there is a limit to the length of the metal oxide nanofibers which can form a homogeneous suspension, and a non-uniform suspension makes it difficult to manufacture a homogeneous filter. Furthermore, although the filtration efficiency of ultrafine particles such as viruses is very high because of a pore size of 1~100 nm, the permeation flow rate undesirably decreases.

As described above, conventional filters known to date are still unsatisfactory in terms of filtration efficiency, permeation flow rate, heat resistance, preparation and so on, the properties being required of an excellent water treatment filter material.

DISCLOSURE OF INVENTION

It is, therefore, an object of the present invention to provide a circulatory ceramic filter which exhibits a high permeation flow rate because of low pressure drop upon filtration while having high filtration efficiency enough to remove ultrafine particles such as viruses, and also which is able to be regenerated, thus having a long lifespan, and a method of manufacturing same.

In accordance with one aspect of the present invention, there is provided a ceramic filter comprising a filtering layer of a fibrous porous body, wherein the fibrous porous body comprises continuous ultrafine fibers of metal oxide which are randomly arranged and layered, and powdery nano-alumina incorporated into the ultrafine fibers or coated thereon, the ultrafine fibers being obtained by electrospinning a spinning solution comprising a metal oxide precursor sol-gel solution, and optionally, a polymer resin, and sintering the electrospun fibers, in which the ultrafine fibers have an average diameter of 10~500 nm, and the fibrous porous body has a pore size of maximum frequency ranging from 0.05 to 2 μm.

In accordance with another aspect of the present invention, there is provided a method for preparing the ceramic filter, which comprises the steps of:

(1) electrospinning a metal oxide precursor sol-gel solution or a mixture of a metal oxide precursor sol-gel solution and a polymer resin to make a layer of continuous ultrafine fibers randomly arranged; and (2) sintering the electrospun ultrafine fibers at a temperature ranging from 250 to 1000° C., wherein (A) in step (1), before the electrospinning, the metal oxide precursor sol-gel solution or the mixture of the metal oxide precursor sol-gel solution and the polymer resin is additionally mixed with one-dimensional powdery nano-alumina; (B) the sintered ultrafine fibers from step (2) are impregnated or coated with a suspension of one-dimensional powdery nano-alumina; or (A) and (B) both are performed.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The ceramic filter according to the present invention is characterized by comprising a filtering layer of a fibrous porous body, which comprises continuous ultrafine fibers of metal oxide which are randomly arranged and layered, and powdery nano-alumina incorporated into the ultrafine fibers or coated thereon, the ultrafine fibers being obtained by electrospinning a spinning solution comprising a metal oxide precursor sol-gel solution, and optionally, a polymer resin, and sintering the electrospun fibers, in which the ultrafine fibers have an average diameter of 10~500 nm, and the fibrous porous body has a pore size of maximum frequency ranging from 0.05 to 2 μm.

In the ceramic filter according to the present invention, the porous body comprising ultrafine fibers is manufactured by electrospinning the metal oxide precursor sol-gel solution or the mixture of the metal oxide precursor sol-gel solution and the polymer resin, thereby randomly arranging continuous ultrafine fibers to form a layer, and sintering the electrospun fibers. Such ultrafine continuous fibers of metal oxide are formed by electrospinning the afore-mentioned solution through a nozzle under a high-voltage electric field, into continuous ultrafine fibers having a diameter ranging from several nm to several μm and a length ranging from several ten cm to several hundred m, unlike powdery metal oxide-based nanofibers, nanorods, nanotubes, nanoparticles and so on which are typically prepared using a chemical synthesis process. In the present invention, the porous body is formed by electrospun continuous fibers of metal oxide randomly arranged and layered.

Figure 1:
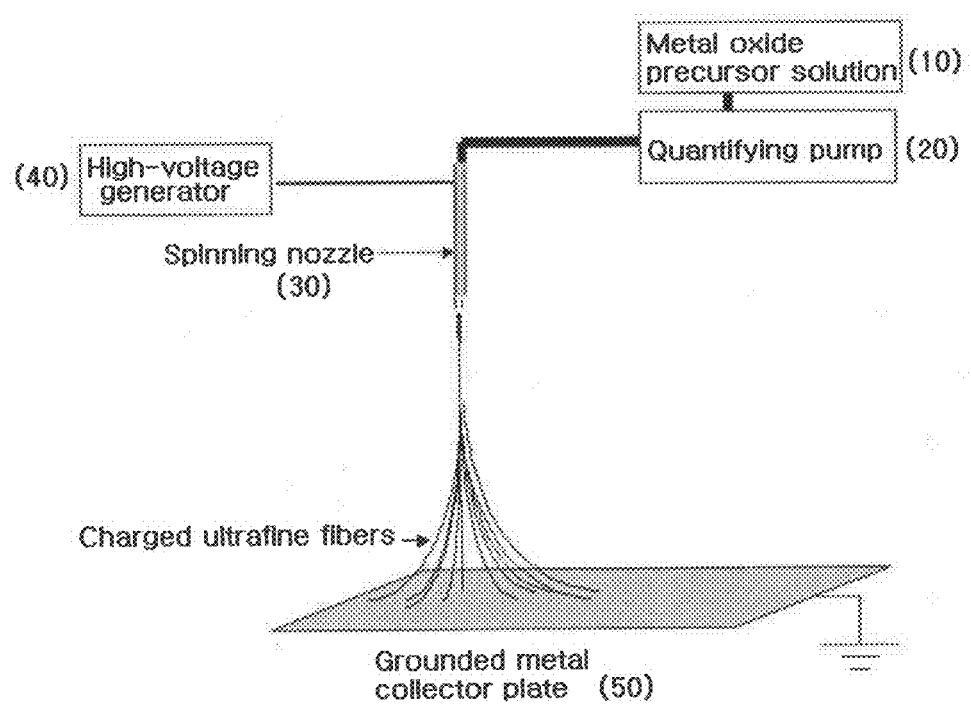
FIG. 1 illustrates a schematic view of an electrospinning device used in the present invention.

The principle of electrospinning to form ultrafine continuous fibers of metal oxide according to the present invention is well represented in various pieces of literature [G. Taylor. Proc. Roy. Soc. London A, 313, 453 (1969); J. Doshi and D. H. Reneker, J. Electrostatics, 35 151 (1995)]. As shown in FIG. 1, unlike electrostatic spray in which a low-viscosity liquid is sprayed in the form of ultrafine drops under a high-voltage electric field not lower than a critical voltage, the metal oxide precursor solution having sufficient viscosity is formed into ultrafine fibers under a high-voltage electrostatic force, which is called electrospinning. The electrospinning device includes a barrel (10) for storing a metal oxide precursor solution, a quantifying pump (20) for discharging the metal oxide precursor solution at a predetermined rate, and a spinning nozzle (30) connected to a high-voltage generator (40). The metal oxide precursor solution is discharged via the quantifying pump (20) in the form of ultrafine fibers while passing through the spinning nozzle (30) electrically charged by the high-voltage generator (40), and accumulates as porous ultrafine fibers on a grounded metal collector plate (50) in the form of a conveyor that moves at a predetermined rate (FIG. 1). When the metal oxide precursor solution is electrospun in this way, ultrafine fibers having a size ranging from several to several thousand nm may be produced and simultaneously may be fused and layered in a three-dimensional network structure, resulting in a desired porous web comprising metal oxide ultrafine fibers. This porous body comprising ultrafine fibers has a volume to surface area ratio much higher than that of conventional fibrous filters, and higher porosity.

In the present invention, the term "electrospinning" is understood as the broadened concept of electrospinning, since the metal oxide ultrafine fibers may also be formed by using melt-blowing, flash spinning, or electro-blowing which is a modification of these processes that uses a high-voltage electrical field and air spraying to manufacture ultrafine fibers. All of these methods have in common the concept of electrospinning including extrusion using a nozzle under an electric field, and thus electrospinning in the present invention includes all such methods.

The filtering precision, namely, filtration efficiency, and also the permeation flow rate are greatly affected by the porosity and the pore size of a filtering layer. According to the present invention, the porous body serves as the filtering layer, and the pore size and distribution, and porosity of the porous body comprising metal oxide ultrafine fibers are mainly affected by the average diameter and diameter distribution of the component fibers. As the fiber diameter decreases, the pore size becomes smaller, and the pore size distribution becomes narrower. Furthermore, the specific surface area of the fibers is increased in proportion to the decrease in the diameter of the fibers, and thus the ability to collect fine particles contained in the filtering solution also increases. Thus, the average fiber diameter of metal oxide ultrafine fibers comprised in the porous body serving as the filtering layer falls in the range of 10~500 nm, and preferably 10~300 nm.

In the case of a membrane filter, the surface layer of the membrane filter has a pore size and porosity different from those of the structure below the surface layer because the evaporation or dissolution-out rate of the solvent in the membrane preparation process varies depending on the depth in the membrane, and also because dead end pores which do not contribute to filtration are present. However, fibrous fibers are entirely uniform in terms of the pore size and porosity and do not have dead end pores. Although the porosity is not a factor used to evaluate the filter performance, high porosity results in a high permeation flow rate. Therefore, in order to ensure high filtration efficiency and high permeation flow rate of the filtering layer, the diameter of component fibers is adjusted according to the present invention.

In the present invention, the pore size of maximum frequency in the pore size distribution of the fibrous porous body is 0.05~2 μm as measured using a capillary flow porometer. However, this does not mean that each and every pore has a single size in the entire pore size distribution, and a filtering layer having both small pores and large pores may be formed, as needed. Specifically, this filtering layer is configured such that a lower layer is composed of fibers having a larger diameter and thus provides a porous layer having a large pore size, and an upper layer is composed of thinner fibers and thus provides a porous layer comprising pores having a smaller pore size, thereby forming a multi-layered structure or the gradation in structure.

Such a filtering layer having the multilayered or gradation structure may be easily formed by layering fibers having a large diameter and then layering thinner fibers during the electrospinning process.

In the fibrous porous body manufactured using electrospinning, the porosity and the pore size do not decrease in proportion to the decrease in the diameter of the fibers. For example, in case that the average fiber diameter is 2.3 μm, 1.3 μm, 0.7 μm, and 0.5 μm, the size of pores which are the major component (i.e., the pore size of maximum frequency) in the pore size distribution is 6.7 μm, 4.5 μm, 2.2 μm and 1.7 μm, respectively, and the porosity is reduced from 90% to 80%. Specifically, the porosity and the pore size are not greatly reduced relative to the degree of reduction of the diameter of the fibers. Although the pore size for filtering ultrafine particles such as viruses is required to be 1~100 nm, it is very difficult to reduce the pore size of the fibrous porous body using electrospinning to this level. When a porous body having such a small pore size is manufactured, high filtration efficiency may be obtained but a permeation flow rate remarkably decreases due to a high pressure drop.

Thus, in order to filter ultrafine particles such as viruses, a porous body as the filtering layer is formed using ultrafine fibers having an average diameter of 10~500 nm, preferably 10~300 nm, and more preferably 10~100 nm, and a porous layer comprising fibers having a larger diameter is formed as the lower layer. The ultrafine continuous fibers of metal oxide may be subjected to heat compression at a temperature ranging from room temperature to 250° C. so that the permeation flow rate is not greatly lost, thus reducing the porosity and pore size of the porous body. When a polymer resin is included, heat compression may be performed at a temperature ranging from a glass transition temperature of the polymer to a melting point thereof.

Typically, when ultrafine fibers composed exclusively of a polymer, which are manufactured using electrospinning, are heat compressed as above, the porosity of a porous body comprising the fibers may decrease to 20% or less. When the compression level becomes higher, the porous structure itself may almost be broken due to melting of the polymer resin component.

In the present invention, because the porous body comprising ultrafine continuous fibers of metal oxide obtained by electrospinning the metal oxide precursor sol-gel solution or the mixture of the metal oxide precursor sol-gel solution and the polymer resin has a relatively high porosity of about 70~95%, the ultrafine fibers are preferably subjected to heat compression so as to achieve an appropriate porosity of 10~80%. The metal oxide sol-gel phase is provided after heat compression, thus increasing the heat resistance of the polymer resin component, thereby maintaining the porous structure.

Subsequently, the ultrafine continuous fibers of metal oxide, whether heat compressed or not, are sintered at 250~1000° C., thereby obtaining a desired ceramic filter comprising a filtering layer of a fibrous porous body.

Conversion into the metal oxide ultrafine fibers is completed by means of the above sintering treatment. In this procedure, the organic product of the sol-gel reaction and the polymer resin components are pyrolyzed and removed. Hence, the specific surface area of the metal oxide ultrafine continuous fibers increases, the average diameter of the fibers greatly decreases, and the porosity of the fibrous porous body which was greatly reduced after heat compression increases again.

Consequently, it is very difficult for the porous body comprising ultrafine fibers composed exclusively of a polymer which is manufactured using electrospinning to have a fiber diameter, a pore size and porosity necessary for providing high filtration efficiency and high permeation flow rate. However, the porous body according to the present invention is composed of ceramic fibers having a much narrower diameter and larger specific surface area, and the pore size of the porous body is much smaller but the porosity thereof is higher, thus achieving high filtration efficiency and high permeation flow rate required to filter fine particles.

The metal oxide precursor according to the present invention is $M(OR)_x$, $MR_x(OR)_y$, $MX_y$, $M(NO_3)_y$ (M=metal including Si, Al, etc.; R=alkyl group; X=F, Cl, Br, I; x and y=each independently an integer of 1~4), or a mixture thereof. The ultrafine continuous fibers prepared therefrom are sintered at 250~1000° C., yielding a porous body comprising ultrafine ceramic fibers of metal oxide selected from the group consisting of silica ($SiO_2$), gamma-alumina ($\gamma$-$Al_2O_3$), and a mixture thereof.

In the present invention, the polymer resin used in combination with the metal oxide precursor sol-gel solution includes a polymer resin in which carbon components do not remain after sintering at 250~1000° C. Specific examples of the polymer resin include polyvinylpyrrolidone (PVP), polyvinylalcohol (PVA), polyvinylacetate (PVAc), polyethylene oxide (PEO), and a mixture thereof.

However, the polymer resin is not necessarily limited to a polymer resin in which carbon components do not remain after sintering, and a polymer resin which is carbonized during sintering to thus form carbon fibers may be used in the present invention. For example, polyacrylonitrile or its copolymer is prepared into fibers, which are then carbonized to yield carbon fibers which are stable even at 1000° C. or higher and have superior mechanical properties. Thus, in case that a mixture of a metal oxide sol-gel precursor and polyacrylonitride or its copolymer is used, a filter formed of ceramic/carbon composite fibers is obtained.

In order to filter ultrafine particles such as viruses at high efficiency, the pore size of the filtering layer should be about 1~100 nm, preferably about 1~60 nm. Although the filtering layer having such ultrafine pores has very high filtration efficiency, it is problematic because the pressure drop is too large and the permeation flow rate is too low. In the inventive porous body, the size of pores which are the major component (i.e., the pore size of maximum frequency) in the pore size distribution is in the range of 0.05~2 μm.

In order for the fibrous porous body having such a pore size structure to efficiently filter ultrafine particles (viruses, metal ions, organic materials and inorganic particles), before the electrospinning, the metal oxide precursor sol-gel solution or the mixture solution of the metal oxide precursor sol-gel solution and the polymer resin is additionally mixed with one-dimensional powdery nano-alumina, so that nano-alumina is incorporated into the ultrafine fibers; or the sintered ultrafine fibers are impregnated or coated with a suspension of one-dimensional powdery nano-alumina to adsorb the nano-alumina onto the surface of the fibers; or both these processes are performed. The resulting porous body includes 1~90 wt % of nano-alumina based on the total weight of the porous body.

The one-dimensional powdery nano-alumina may include nanoparticles of boehmite (AlOOH), aluminum hydroxide ($Al(OH)_3$), gamma-alumina ($\gamma$-$Al_2O_3$) and a mixture thereof, which are provided in the form of nanorods, nanotubes or nanofibers, having a diameter of 1 nm or more and a diameter to length ratio (an aspect ratio) of 5 or more.

The ceramic filter according to the present invention which includes the filtering layer of the porous body comprising ultrafine continuous fibers of metal oxide may be provided in various forms, such as layered flat panels, pleats, spirals, etc.

As described above, the ceramic filter according to the present invention has high filtration efficiency enough to remove ultrafine particles such as viruses in water and air, and has low pressure drop upon filtration to show a high flow rate, and can be regenerated and thus has a long lifespan. Therefore, it is very useful as an environmentally friendly and excellent water treatment filter.

The following Examples and Comparative Examples are given for the purpose of illustration only, and are not intended to limit the scope of the invention.

EXAMPLE

The properties of each of the fibers, porous bodies and filters including same as a filtering layer, as manufactured in the following examples and comparative examples, were measured by the following methods.

Diameter of Metal Oxide Ultrafine Fibers in Porous Body

From scanning electron microscope (SEM) images of the surface or the cross-section of the porous body comprising ultrafine continuous fibers of metal oxide, the diameter of the metal oxide ultrafine fibers was measured using Sigma Scan Pro 5.0 (SPSS), so that the average diameter and the diameter distribution could be evaluated.

Pore Size of Porous Body Comprising Metal Oxide Ultrafine Continuous Fibers

The average pore size was measured in the pressure range of 0~30 psi using a capillary flow porometer available from PMI (version 7.0), and the pore size was calculated from a wet flow curve and a dry flow curve as measured. As such, perfluoropolyether (oxidized and polymerized 1,1,2,3,3,3-hexafluoropropene) was used as a wetting agent.

Porosity

The porosity of the porous body comprising ultrafine continuous fibers of metal oxide was evaluated by butanol impregnation as represented by Equation 1 below.

$$\text{Porosity (\%)} = \{(M_{BuOH}/\rho_{BuOH})/(M_{BuOH}/\rho_{BuOH} + M_m/\rho_p)\} \times 100 \quad \text{Equation 1}$$

wherein $M_{BuOH}$ is the weight of absorbed butanol, $M_m$ is the weight of the porous body comprising metal oxide fibers, $\rho_{BuOH}$ is the density of butanol, and $\rho_p$ is the density of the metal oxide fibers.

Filtering Precision (Filtration Efficiency)

30 ml of a 0.1 wt % suspension, prepared by diluting an aqueous suspension of 10 wt % polystyrene latex particles (Magshere Inc.) having a diameter of 90 nm with deionized water, was supplied and passed through a porous body comprising ultrafine continuous fibers of metal oxide using a vacuum system so that a difference in pressure between the supplying solution and the permeated solution was 35 kPa, and the concentration of latex nanoparticles contained in the initial suspension and the permeated solution that passed through the porous body comprising ultrafine continuous fibers of metal oxide was determined by quantitatively evaluating the intensity of absorbance at 200~205 nm using a UV-visible spectrometer, and the filtration efficiency of the filter was evaluated by Equation 2 below. Also, 5 μl of the permeated solution was placed on a slide glass and then dried in a vacuum, after which the number of latex particles was counted to evaluate the filtration efficiency of the filter.

$$\text{Filtration Efficiency (\%)} = [1 - (C_t/C_0)] \times 100 \quad \text{Equation 2}$$

wherein $C_t$ is the concentration of latex particles of the permeated solution, and $C_0$ is the concentration of latex particles of the initial suspension.

Permeation Flow Rate

As in the measurement of the filtering precision, the filter was mounted to a filter holder, and while deionized water at 25° C. was supplied so as to achieve a pressure difference of 35 kPa, the permeation time was measured for every 5 ml of the permeated solution that passed through the filter, thus determining the permeation flow rate.

Example 1

Figure 2A:
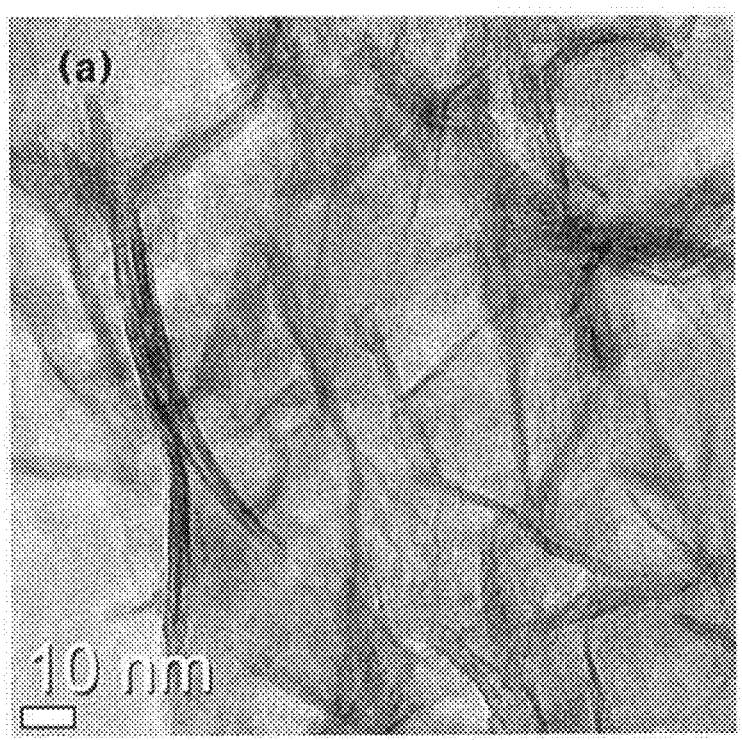
FIGS. 2A and 2B depict a transmission electron microscope (TEM) image and an X-ray diffraction (XRD) pattern of boehmite nanofibers manufactured in Example 1, respectively.
Figure 2B:
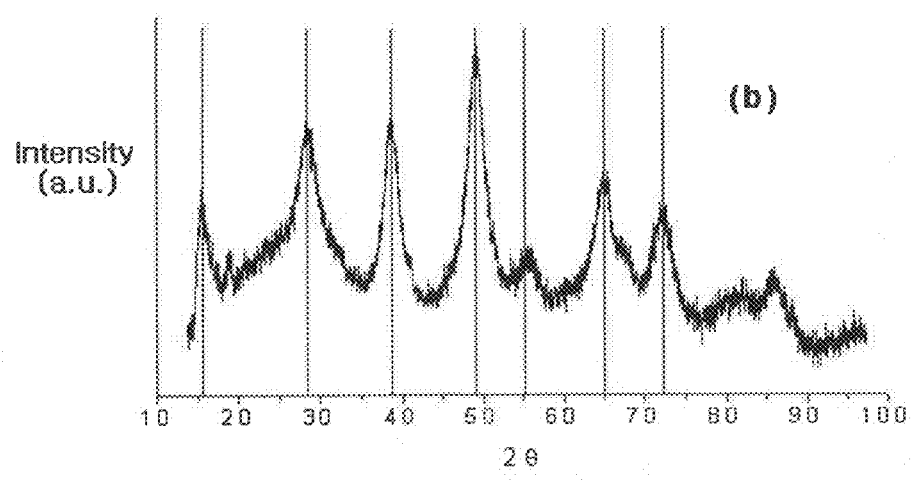

A mixture solution comprising 7 g of aluminum isopropoxide (AIP), 40 ml of ethylalcohol, 10 ml of water, and 25 μl of HCl was sonicated for 1 hour and stirred at about 90° C. for 3 hours, after which the reaction product was diluted with ethanol and filtered to prepare boehmite nanofibers as powdery nano-alumina. The TEM image and the XRD pattern of the boehmite nanofibers are shown in FIGS. 2A and 2B, respectively,

Comparative Example 1

Figure 3:
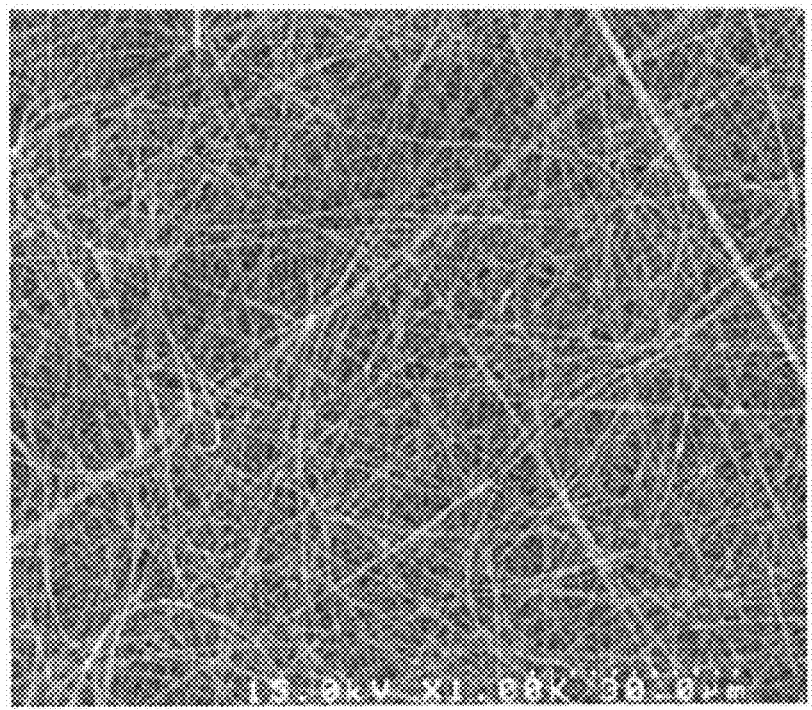
FIG. 3 shows a scanning electron microscope (SEM) image of a porous body comprising $SiO_2$ nanofibers manufactured in Comparative Example 1.

A mixture solution comprising 20.8 g of tetraethoxyorthosilicate (TEOS), 9.2 g of ethylalcohol, 3.5 g of water, and 0.1 g of aqueous hydrochloric acid was stirred at about 70° C. for about 3 hours to prepare a silica sol-gel solution, which was then discharged at a rate of 20 μl/min under a high-voltage electric field of 20 kV using the 30 G spinning nozzle of the electrospinning device of FIG. 1, to manufacture a layer of continuous ultrafine fibers randomly arranged having an average diameter of 230 nm. The ultrafine fibers were heat compressed at 150° C. and then sintered at about 350° C., thereby manufacturing a porous body comprising silica ultrafine fibers having an average fiber diameter of 170 nm (minimum 130 nm~maximum 270 nm) and a specific surface area of 187 m²/g, with a porosity of 86% and a pore size of 1.2 μm. The SEM image of the porous body comprising silica ultrafine fibers is shown in FIG. 3.

Using the porous body as the filtering layer of the filter, the filtering precision and the permeation flow rate were measured. The results are shown in Table 1 below.

Example 2

6 g of the powdery boehmite nanofibers of Example 1 was mixed with the TEOS solution of Comparative Example 1, and 0.12 g of polyvinylpyrrolidone (PVP, mw 1,300,000) was added thereto to prepare a homogeneous mixture solution, which was then discharged at a rate of 20 μl/min under a high-voltage electric field of 20 kV using the 27 G spinning nozzle of the electrospinning device of FIG. 1, to obtain a layer of continuous ultrafine fibers randomly arranged having an average diameter of 230 nm. The ultrafine fibers were heat compressed at 100° C., and sintered at about 300° C., thereby manufacturing a porous body comprising silica/boehmite ultrafine fibers having an average fiber diameter of 100 nm (minimum 85 nm~maximum 250 nm) with a porosity of 76% and a pore size of 0.8 μm. This fibrous porous body had 53.5 wt % boehmite based on the total weight of the porous body.

Using the porous body as the filtering layer of the filter, the filtering precision and the permeation flow rate were measured. The results are shown in Table 1 below.

Example 3

A mixture (molar ratio of aluminum nitrate:aluminum isopropoxide:TEOS=3:9:4) comprising 15 g of aluminum isopropoxide, 9.4 g of aluminum nitrate, 7 g of TEOS, 40 ml of ethylalcohol, 10 ml of water, and 50 ml of aqueous hydrochloric acid was mixed with 3 g of PVP and stirred at about 70° C. for 2 hours to prepare a mixture solution. This solution was discharged at a rate of 20 μl/min under a high-voltage electric field of 26.5 kV using the 30 G spinning nozzle of the electrospinning device of FIG. 1, to obtain a layer of continuous ultrafine fibers randomly arranged having an average diameter of 151 nm (minimum 100 nm~maximum 205 nm). The ultrafine fibers were sintered at about 500° C., from which PVP was then removed, thus manufacturing a porous body comprising alumina/silica ultrafine fibers having an average fiber diameter of 85 nm (minimum 55 nm~maximum 125 nm) with a porosity of 89% and a pore size of 0.4 μm.

Figure 5A:
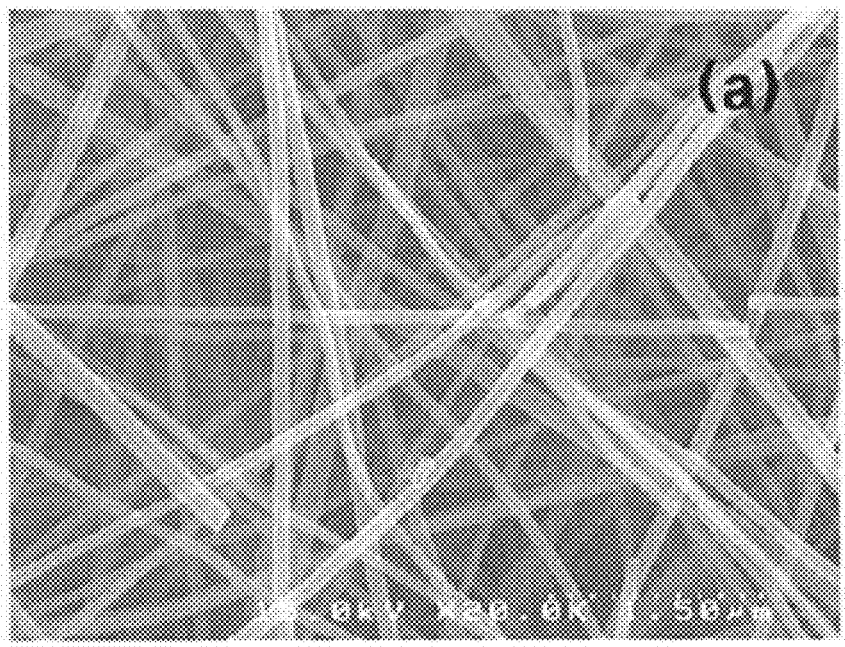
FIGS. 5A and 5B describe SEM images of a porous body comprising alumina/silica ultrafine fibers manufactured in Example 2 before and after adsorption of boehmite nanoparticles, respectively.
Figure 5B:
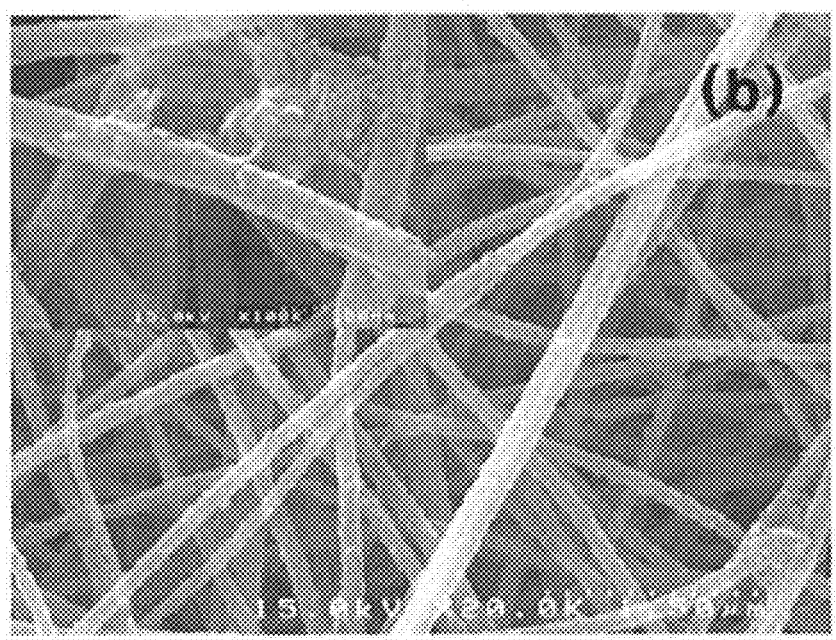

The resulting fibers were impregnated with a solution obtained by dispersing the boehmite nanoparticles of Example 1 in an amount of 2 wt % in a mixture solution of water and ethanol, so that boehmite nanoparticles were adsorbed on the porous body, followed by drying. The adsorbed boehmite amount was 1.3 wt % based on the total weight of the fibrous porous body on which boehmite was adsorbed. The SEM images of the porous body comprising alumina/silica ultrafine fibers before and after adsorption of boehmite nanoparticles are respectively shown in FIGS. 5A and 5B.

Using the porous body having the adsorbed boehmite nanoparticles as the filtering layer of the filter, the filtering precision and the permeation flow rate were measured. The results are shown in Table 1 below.

Comparative Example 2

Figure 6A:
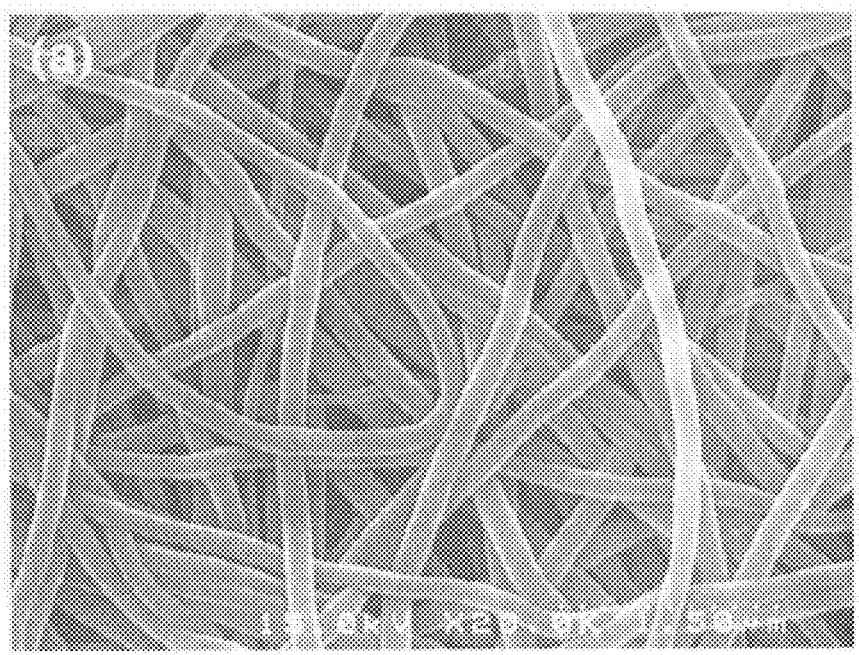
FIGS. 6A and 6B illustrate SEM images of a porous body comprising alumina/silica ultrafine fibers manufactured in Comparative Example 2 before and after sintering, respectively.
Figure 6B:
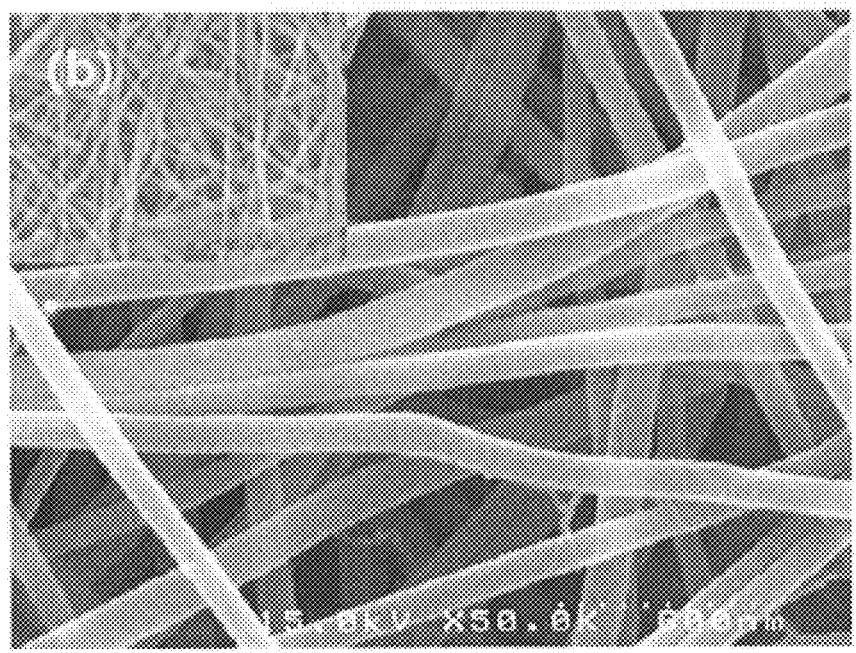

The porous body comprising alumina/silica ultrafine fibers of Example 3 was compressed to ½ of the original thickness at 30° C. before being sintered at 500° C., to manufacture a porous body comprising ultrafine fibers having an average fiber diameter of 88 nm (minimum 40 nm~maximum 130 nm) with a porosity of 70% and a pore size of 0.12 μm. The SEM images of the porous body comprising alumina/silica ultrafine fibers before and after sintering are respectively shown in FIGS. 6A and 6B.

Using the porous body as the filtering layer of the filter, the filtering precision and the permeation flow rate were measured. The results are shown in Table 1 below.

Example 4

Figure 7A:
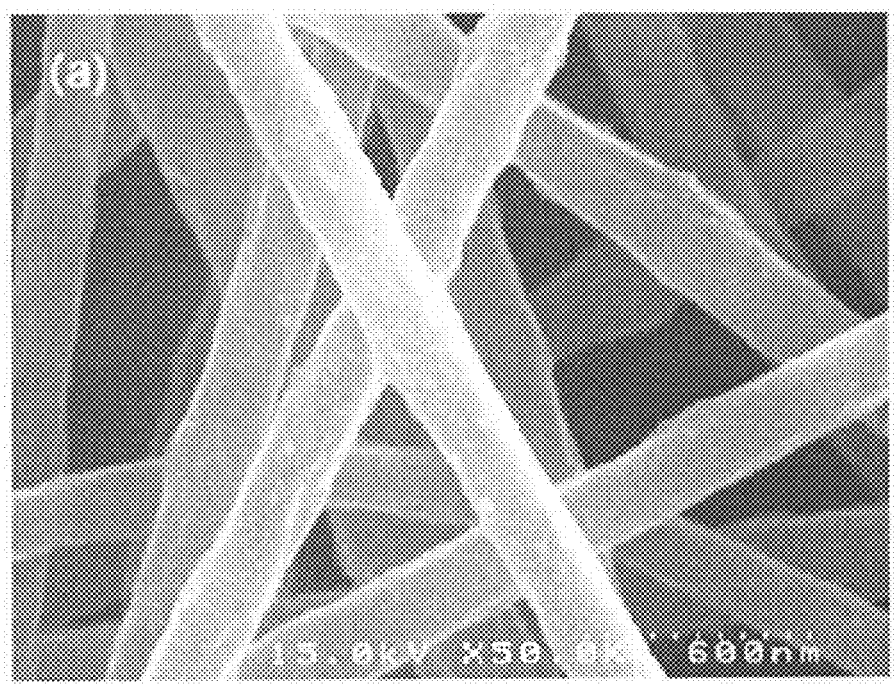
FIGS. 7A and 7B show SEM images of a porous body comprising alumina/silica/boehmite ultrafine fibers manufactured in Example 4 before and after compression and sintering, respectively.
Figure 7B:
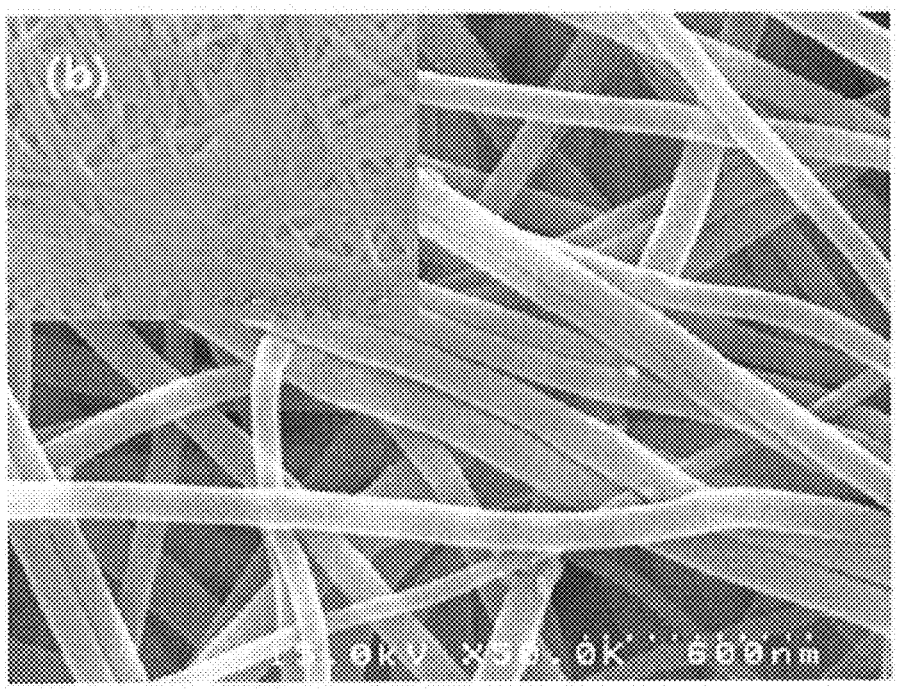

A mixture (molar ratio of aluminum nitrate:aluminum isopropoxide:TEOS=3:9:4) comprising 6 g of the powdery boehmite nanofibers of Example 1, 15 g of aluminum isopropoxide, 9.4 g of aluminum nitrate, 7 g of TEOS, 40 ml of ethylalcohol, 10 ml of water, and 50 ml of aqueous hydrochloric acid was mixed with 3 g of PVP and stirred at about 70° C. for 2 hours to prepare a mixture solution. This solution was discharged at a rate of 20 μl/min under a high-voltage electric field of 28 kV using the 27 G spinning nozzle of the electrospinning device of FIG. 1, to obtain a layer of continuous ultrafine fibers randomly arranged. The ultrafine fibers were compressed to ⅕ of the original thickness at 40° C. and then sintered at 350° C., thus manufacturing a porous body comprising ultrafine fibers having an average diameter of 89 nm (minimum 40 nm-maximum 130 nm) with a porosity of 65% and a pore size of 0.05 μm. This fibrous porous body had 49.5 wt % boehmite based on the total weight of the porous body. The SEM images of the porous body comprising alumina/silica/boehmite ultrafine fibers before and after compression/sintering are respectively shown in FIGS. 7A and 7B. It can be seen from the image of FIG. 7A that boehmite with a very rough shape is exposed on the fiber surface.

Using the porous body having the adsorbed boehmite nanoparticles as the filtering layer of the filter, the filtering precision and the permeation flow rate were measured. The results are shown in Table 1 below.

Comparative Example 3

Figure 4:
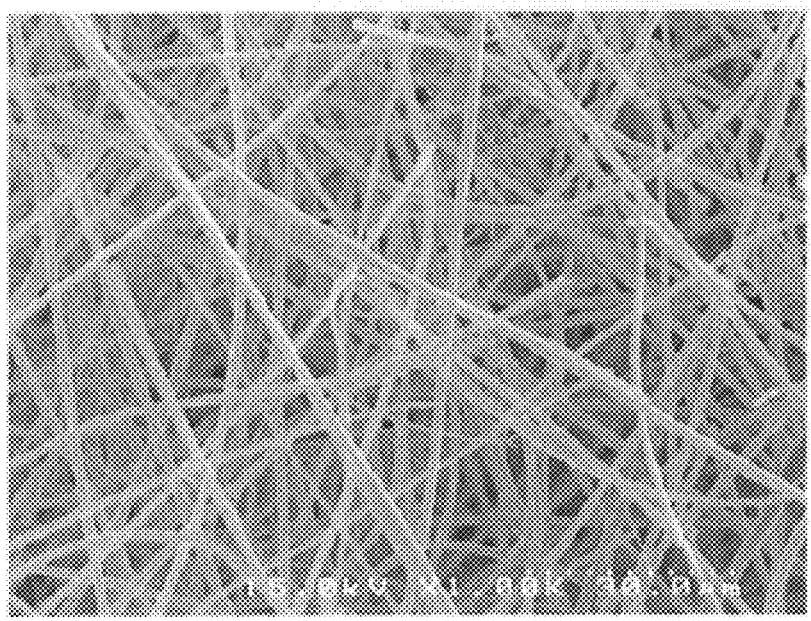
FIG. 4 is an SEM image of a porous body comprising γ-$Al_2O_3$ ultrafine fibers manufactured in Comparative Example 3.

A mixture solution comprising 7 g of aluminum isopropoxide, 40 ml of ethylalcohol, 10 ml of water, and 25 ml of aqueous hydrochloric acid was stirred to prepare an aluminum isopropoxide sol-gel solution. A solution of 1.5 g of PVP dissolved in 5 ml of ethylalcohol was added to the sol-gel solution and stirred at about 70° C. for 2 hours to prepare a mixture solution. This solution was discharged at a rate of 40 μl/min under a high-voltage electric field of 15.5 kV using the 24 G spinning nozzle of the electrospinning device of FIG. 1, to obtain a layer of continuous ultrafine fibers randomly arranged. The ultrafine fibers were sintered at about 500° C., from which PVP was then removed, thus manufacturing a porous body comprising alumina ultrafine fibers having an average fiber diameter of 600 nm with a porosity of 85% and a pore size of 1.9 μm. The SEM image of the porous body comprising alumina ultrafine fibers is shown in FIG. 4.

Using the porous body having the adsorbed boehmite nanoparticles as the filtering layer of the filter, the filtering precision and the permeation flow rate were measured. The results are shown in Table 1 below.

Comparative Example 4

A mixture (molar ratio of aluminum nitrate:aluminum isopropoxide:TEOS=3:9:4) comprising 15 g of aluminum isopropoxide, 9.4 g of aluminum nitrate, 7 g of TEOS, 40 ml of ethylalcohol, 10 ml of water, and 50 ml of aqueous hydrochloric acid was mixed with 0.5 g of PVP and stirred at about 70° C. for 2 hours to prepare a mixture solution. This solution was discharged at a rate of 30 μl/min under a high-voltage electric field of 17 kV using the 24 G spinning nozzle of the electrospinning device of FIG. 1, to obtain a layer of continuous ultrafine fibers randomly arranged. The ultrafine fibers were sintered at about 500° C., from which PVP was then removed, thus manufacturing a porous body comprising alumina ultrafine fibers having an average fiber diameter of 1.3 μm (minimum 0.7 μm~maximum 2.5 μm) with a porosity of 91% and a pore size of 4.5 μm.

Using the porous body having the adsorbed boehmite nanoparticles as the filtering layer of the filter, the filtering precision and the permeation flow rate were measured. The results are shown in Table 1 below.

Comparative Example 5

The procedure of Comparative Example 1 was repeated except for using 0.3 g of PVP instead of 1.5 g of PVP, to obtain a layer of continuous ultrafine fibers randomly arranged. The ultrafine fibers were sintered at about 500° C., from which PVP was then removed, thus manufacturing a porous body comprising alumina ultrafine fibers having an average fiber diameter of 2.0 μm (minimum 1.6 μm~maximum 2.6 μm) with a porosity of 90% and a pore size of 6.0 μm.

Using the porous body having the adsorbed boehmite nanoparticles as the filtering layer of the filter, the filtering precision and the permeation flow rate were measured. The results are shown in Table 1 below.

TABLE 1

| | Average Diameter (nm) of Metal Oxide Ultrafine Fibers | Pore Size (μm) of Porous Body comprising Metal Oxide Ultrafine Fibers | Filtration Efficiency (%) | Permeation Flow Rate (l/m$^2$ · hr · pa) |
|---|---|---|---|---|
| C. Ex. 1 | 170 | 1.2 | 94 | 0.06 |
| Ex. 2 | 100 | 0.8 | 98 | 0.041 |
| Ex. 3 | 85 | 0.4 | 100 | 0.040 |
| C. Ex. 2 | 88 | 0.12 | 100 | 0.025 |
| Ex. 4 | 89 | 0.05 | 100 | 0.011 |
| C. Ex. 3 | 600 | 1.9 | 65 | 0.251 |
| C. Ex. 4 | 1300 | 4.7 | 1.3 | 10.15 |
| C. Ex. 5 | 2000 | 6.0 | 0.9 | 16.20 |

As is apparent from Table 1, the filters obtained in Comparative Examples 1 and 2 and Examples 2 to 4 are able to filter almost all of the particles having a diameter of 90 nm and can exhibit a high permeation flow rate. However, with regard to the ultrafine particles such as viruses smaller than 90 nm, the filters of Comparative Examples 1 and 2 are expected to have much lower filtration efficiency because nano-alumina is neither incorporated nor adsorbed. Also, the filters of Comparative Examples 3 to 5 have a high permeation flow rate, but the filtration efficiency of 90 nm particles is low to the extent of 65%, or is very low to the extent that almost all of the 90 nm particles pass therethrough.

The invention claimed is:

1. A method for preparing a ceramic filter, which comprises the steps of:
   (1) electrospinning a metal oxide precursor sol-gel solution or a mixture of a metal oxide precursor sol-gel solution and a polymer resin to make a layer of continuous ultrafine fibers randomly arranged, wherein the metal oxide precursor is selected from a group consisting of $M(OR)_x$, $MR_x(OR)_y$, $MX_y$, and $M(NO_3)_y$, wherein
   M comprises Si (silicon) or Al (aluminum),
   R comprises an alkyl group,
   X is selected from the group consisting of F (fluorine), Cl (chlorine), Br (bromine) and I (iodine),
   x and y are each independently an integer of 1 to 4; and
   (2) sintering the electrospun ultrafine fibers at a temperature ranging from 250 to 1000° C.,
   wherein (A) in step (1), before the electrospinning, the metal oxide precursor sol-gel solution or the mixture of the metal oxide precursor sol-gel solution and the polymer resin is additionally mixed with one-dimensional powdery nano-alumina; or (B) the sintered ultrafine fibers from step (2) are impregnated or coated with a suspension of one-dimensional powdery nano-alumina; or (A) and (B) both are performed.

2. The method of claim 1, wherein, before the sintering of step (2), the ultrafine fibers are subjected to heat compression at a temperature ranging from room temperature to 250° C.

3. The method of claim 1, wherein the ultrafine fibers have an average diameter of 10~500 nm.

4. The method of claim 1, wherein the one-dimensional powdery nano-alumina is a nanoparticle selected from the group consisting of boehmite (AlOOH), aluminum hydroxide ($Al(OH)_3$), gamma-alumina ($\gamma$-$Al_2O_3$) and a mixture thereof, which are provided in the form of nanorods, nanotubes or nanofibers, having a diameter of 1 nm or more and a diameter to length ratio (an aspect ratio) of 5 or more.

5. The method of claim 1, wherein the ultrafine fibers are made of a metal oxide selected from the group consisting of silica ($SiO_2$), gamma-alumina ($\gamma$-$Al_2O_3$), and a mixture thereof.

6. The method of claim 1, wherein the polymer resin is selected from the group consisting of polyvinylpyrrolidone, polyvinylalcohol, polyvinylacetate, polyethylene oxide, and a mixture thereof.

7. The method of claim 1, wherein the polymer resin is polyacrylonitrile or its copolymer.

8. The method of claim 1, wherein the electrospinning in step (1) is melt-blowing, flash spinning, or electro-blowing.

9. A method for preparing a ceramic filter, which comprises the steps of:
(1) electrospinning a metal oxide precursor sol-gel solution or a mixture of a metal oxide precursor sol-gel solution and a polymer resin to make a layer of continuous ultrafine fibers randomly arranged, wherein the metal oxide precursor is selected from a group consisting of $M(OR)_x$, $MR_x(OR)_y$, $MX_y$, and $M(NO_3)_y$, wherein
M comprises Al (aluminum),
R comprises an alkyl group,
X is selected from the group consisting of F (fluorine), Cl (chlorine), Br (bromine) and I (iodine),
x and y are each independently an integer of 1 to 4; and
(2) sintering the electrospun ultrafine fibers at a temperature ranging from 250 to 1000° C.,
wherein (A) in step (1), before the electro pinning, the metal oxide precursor sol-gel solution or the mixture of the metal oxide precursor sol-gel solution and the polymer resin is additionally mixed with one-dimensional powdery nano-alumina; or (B) the sintered ultrafine fibers from step (2) are impregnated or coated with a suspension of one-dimensional powdery nano-alumina; or (A) and (B) both are performed.

10. The method of claim 9, wherein, before the sintering of step (2), the ultrafine fibers are subjected to heat compression at a temperature ranging from room temperature to 250° C.

11. The method of claim 9, wherein the ultrafine fibers have an average diameter of 10~500 nm.

12. The method of claim 9, wherein the one-dimensional powdery nano-alumina is a nanoparticle selected from the group consisting of boehmite (AlOOH), aluminum hydroxide ($Al(OH)_3$), gamma-alumina ($\gamma$-$Al_2O_3$) and a mixture thereof, which are provided in the form of nanorods, nanotubes or nanofibers, having a diameter of 1 nm or more and a diameter to length ratio (an aspect ratio) of 5 or more.

13. The method of claim 9, wherein the ultrafine fibers are made of a metal oxide selected from the group consisting of gamma-alumina ($\gamma$-$Al_2O_3$) and a mixture of gamma-alumina ($\gamma$-$Al_2O_3$) and silica ($SiO_2$).

14. The method of claim 9, wherein the polymer resin is selected from the group consisting of polyvinylpyrrolidone, polyvinylalcohol, polyvinylacetate, polyethylene oxide, and a mixture thereof.

15. The method of claim 9, wherein the polymer resin is polyacrylonitrile or its copolymer.

16. The method of claim 9, wherein the electrospinning in step (1) is melt-blowing, flash spinning, or electro-blowing.

17. A method for preparing a ceramic filter, which comprises the steps of:
(1) electrospinning a metal oxide precursor sol-gel solution or a mixture of a metal oxide precursor sol-gel solution and a polymer resin to make a layer of continuous ultrafine fibers randomly arranged, wherein the metal oxide precursor is selected from a group consisting of $M(OR)_x$, $MR_x(OR)_y$, $MX_y$, and $M(NO_3)_y$, wherein
M comprises Si (silicon) or Al (aluminum),
R comprises an alkyl group,
X is selected from the group consisting of F (fluorine), Cl (chlorine), Br (bromine) and I (iodine),
x and y are each independently an integer of 1 to 4; and
(2) sintering the electrospun ultrafine fibers at a temperature ranging from 250 to 1000° C.,
wherein (A) in step (1), before the electrospinning, the metal oxide precursor sol-gel solution or the mixture of the metal oxide precursor sol-gel solution and the polymer resin is additionally mixed with one-dimensional powdery nano-alumina; and (B) the sintered ultrafine fibers from step (2) are impregnated or coated with a suspension of one-dimensional powdery nano-alumina.

* * * * *